S. B. WILLIAMS, Jr.
TELEPHONE EXCHANGE SYSTEM.
APPLICATION FILED SEPT. 24, 1920.
1,435,950.
Patented Nov. 21, 1922.
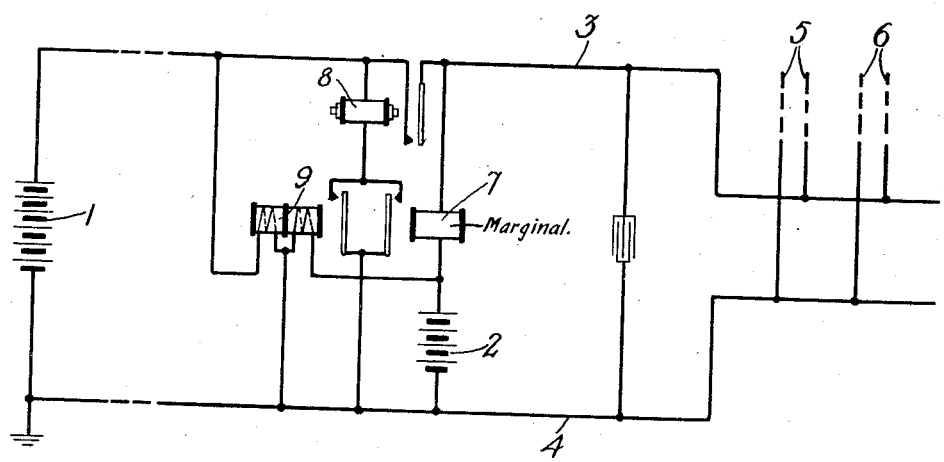
Inventor:
Samuel B. Williams Jr.
by ︎︎︎︎︎, Atty.

Patented Nov. 21, 1922.

1,435,950

UNITED STATES PATENT OFFICE.

SAMUEL B. WILLIAMS, JR., OF BROOKLYN, NEW YORK, ASSIGNOR TO WESTERN ELECTRIC COMPANY, INCORPORATED, OF NEW YORK, N. Y., A CORPORATION OF NEW YORK.

TELEPHONE-EXCHANGE SYSTEM.

Application filed September 24, 1920. Serial No. 412,507.

*To all whom it may concern:*

Be it known that I, SAMUEL B. WILLIAMS, Jr., a citizen of the United States, residing at Brooklyn, in the county of Kings, State of New York, have invented certain new and useful Improvements in Telephone-Exchange Systems, of which the following is a full, clear, concise, and exact description.

This invention relates to improvements in means for controlling the charging of what is commonly known as a booster battery located at a remote point from the charging source and has particular reference to such means as employed in telephone exchanges.

An object of the invention is to provide means whereby the main battery or charging source is utilized to receive part of the drain when the booster battery is taken for use, as when a call is initiated at the exchange where the latter battery is located.

Another object is to maintain the potentials of the batteries within a certain predetermined range and to prevent overcharging of the booster battery.

A feature of the invention is the provision of means unresponsive to variations of potentials between the batteries within a given voltage range, but operable, should the variation exceed said range, to connect said batteries whereby one will aid the other by increasing the potential of the same until the two batteries are again within the required range, whereupon said means again become ineffective.

The drawing is a diagrammatic view of a preferred embodiment of the circuit employed.

The invention is particularly applicable to the controlling of the charging of a booster battery located at an automatic private branch exchange, although it is to be expressly understood that the invention is not limited to such use as the same may be applied to two central office batteries with equal facility, it only being necessary that the supply lead between the batteries be of sufficient size to carry the charge.

Referring more particularly to the drawing, the invention will be described as used in connection with main and private branch exchanges, in which instance the main battery or charging source at the central office is indicated by the numeral 1, and the booster battery at the private branch exchange by 2. 3 and 4 indicate bus bars which supply current to the lines 5 and 6, tapped therefrom for operating various switches in a manner well known in the art.

It will be assumed that when the difference between the potentials of batteries 1 and 2 is less than six volts, proper operating conditions will exist and the means embodied in the invention will be ineffective. However, if the potential variation should exceed the predetermined range, as by a potential increase at the battery 1 or an excessive discharge of the booster battery 2, the means of the invention will then operate to restore the batteries to their proper operating conditions within the given range of potential, whereupon said means will automatically again become ineffective to prevent any serious overcharging of the booster battery.

Thus, with the batteries within the required range, should a call be initiated in the exchange which is supplied with current by battery 2, a circuit will be closed for the marginal relay 7 extending from the positive pole of battery 2 through the winding of relay 7, conductor 3, line 5 or 6, and conductor 4 to the negative pole of battery 2. Relay 7 is energized and thereby closes a circuit for the slow to release relay 8, traceable from the positive pole of battery 1 through the winding of relay 8, the armature and contact of relay 7, conductor 4 and the negative pole of battery 1. By closing its contact, relay 8 connects battery 1 to the conductors 3 and 4, and in this manner a part of the drain on battery 2 is taken by the central office battery.

After all of the switches associated with lines 5 or 6 are restored to normal at the termination of a call, no further drain is placed upon battery 2 and relay 7 releases, but relay 8, being slow to release, maintains its armature attracted for an interval of time. Now, if the potential at battery 2 has fallen so that the difference in potential between the two batteries exceeds the given range of six volts, the elapsed time between the deenergization of relay 8 and the opening of its contacts will be sufficient to permit a circuit to be closed from the positive pole of battery 1, through the contact and armature of relay 8, the winding of relay 7, battery 2 and the conductor 4 to the negative pole of battery 1. It will be noted that the direction of flow of current in this circuit is opposite to that of the original energizing circuit of relay 7, but said relay will, nevertheless, energize and again close the energizing circuit for relay 8 before the latter can open its contacts, thus permitting a charge to be placed upon battery 2 from the central office battery. This charge continues until the difference in potential between the two batteries is again within the desired range, whereupon relay 7, which is adjusted to release under this condition, retracts its armature to open the circuit for relay 8, which, after an interval, releases with the result that the booster battery will no longer be charged by the central office battery.

In order to accomplish this same result when there is no drain upon the battery 2, or in other words, when no call is set up in the exchange served by said battery, a differentially wound relay 9 is provided. When the potential variation between the batteries is within the predetermined range, the windings of relay 9 are balanced by circuits extending from batteries 1 and 2 through the left and right-hand windings, respectively, of said relay. If the potential at battery 1 rises to a value exceeding the desired range, it will be obvious that the excessive amount of current flowing through the left-hand winding of relay 9 will unbalance the windings of said relay, whereupon the same will become energized. An energizing circuit is then established for relay 8 through the contact and armature of relay 9, whereupon, as before, a charge will be placed upon battery 2 through the winding of relay 7. In practice, when relay 8 operates, the potential of battery 2 is immediately raised by the charge from battery 1, and consequently the windings of relay 9 again become balanced so that this relay releases to open the energizing circuit for relay 8. This relay, being slow to release, holds its contact closed for a sufficient length of time to permit relay 7 to operate, so that the charging of battery 2 continues until the releasing value of relay 7 is reached, as above explained. The deenergization of relay 7 again causes relay 8 to release.

From the foregoing description taken in connection with the accompanying drawing, it will be apparent that the invention provides a positive means for utilizing a main battery to receive part of the drain placed upon a booster battery when the latter is taken for use, for maintaining the potentials of the two batteries within a certain predetermined range and for preventing overcharging of one of said batteries.

What is claimed is:

1. The combination of a battery, a charging source therefor, a relay operable to connect said charging source and battery, another relay for operating the first relay when the potential difference between said charging source and battery exceeds a given range, and a third relay operable when said first relay is energized to maintain said relay operated until the potential variation between said charging source and battery is within said range.

2. In a telephone system, two exchanges, a source of potential at each exchange, means operable to connect said sources, and means responsive to the initiation of a call at one of said exchanges for causing the operation of the first named means whereby both sources are subjected to the current drain occasioned by said call.

3. In a telephone system, two exchanges, a source of potential at each exchange, means operable to connect said sources, and means responsive to a call initiated at one exchange for operating the first named means and for maintaining the same operated while any difference in potential exists between said sources in excess of a predetermined range.

4. In a telephone system, two exchanges, a source of potential at each exchange, means operable to connect said sources, and a marginal relay responsive to a call initiated at one exchange for operating the first named means and for maintaining the same operated while any difference in potential exists between said sources in excess of a predetermined range.

5. The combination of a battery, charging source therefor, a relay having contacts for connecting said source and battery, a second relay responsive to differences in potential between said source and said battery to operate the first named relay, and a third relay operable when the first relay is operated to control said first relay.

6. The combination of a battery, a charging source therefor, a slow operating relay to connect said source to said battery for charging the same, a differential relay responsive to differences in potential between said battery and source for operating said slow relay, and a marginal relay operable when the slow relay is operated to control said slow relay.

In witness whereof, I hereunto subscribe my name this 21st day of September A. D., 1920.

SAMUEL B. WILLIAMS, Jr.